May 24, 1960
P. A. RAUER ET AL
2,937,545
CUTTING TOOL
Filed July 28, 1958
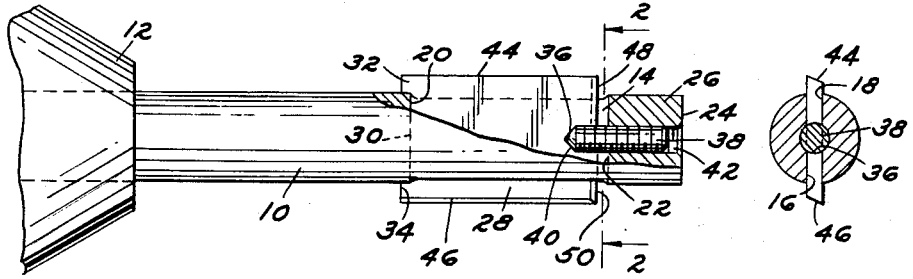
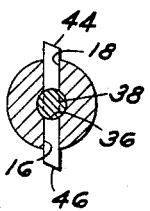
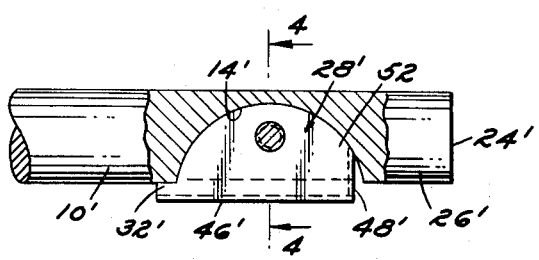
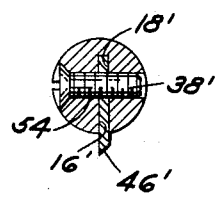
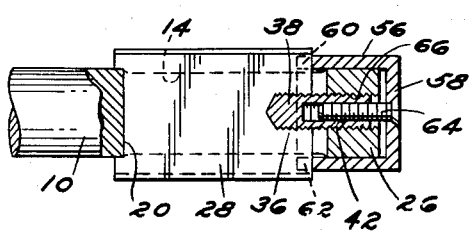
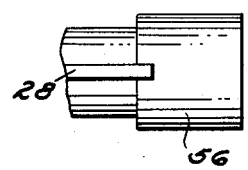
INVENTORS
FRANCIS A. NICHOLLS
PAUL A. RAUER
BY
Burton & Parker
ATTORNEYS

United States Patent Office

2,937,545
Patented May 24, 1960

2,937,545

CUTTING TOOL

Paul A. Rauer, 19125 Centralia Ave., Detroit, Mich., and Francis A. Nicholls, 23244 Violet Ave., Farmington, Mich.

Filed July 28, 1958, Ser. No. 751,381

2 Claims. (Cl. 77—58)

This invention relates to improvements in cutting tools and particularly, though not necessarily exclusively, to a removable blade type counterboring tool.

An object of this invention is the provision of a cutting tool, such as a counterboring tool, which has a cutting blade that may be quickly and easily disassembled from the tool for sharpening or substitution and thereafter readily reassembled with the tool.

Another object of the invention is the provision of a removable blade type cutting tool including a slotted shaft or stem within which is received a cutting blade, with means threadedly engaged in the stem and locking the tool securely in proper position in the stem.

In one form of the invention the tool comprises a stem adapted to be mounted for rotation in a machine tool and having a slot therein extending longitudinally of the stem completely therethrough and spaced from one end of the stem by a pilot portion, with a cutting blade removably received within the slot and having means at that end remote from the pilot cooperating with the stem to locate such end of the blade radially of the stem and having the other end of the blade adjacent the pilot provided with a recess or notch within which a locking screw threaded axially through the pilot is received thereby locating the other end of the blade.

In another form of the invention the slot in the stem is semi-circular and the blade is generally semi-circular to mate with and be received in the slot. One edge of the blade overlaps the stem at one end of the slot. A fastener extends transversely through the stem and against the blade with the fastener and overlapping portion of the blade cooperatively preventing shifting of the blade within the slot and properly locating the blade within the stem.

Another object is the provision of a modified embodiment of the invention wherein a removable blade type cutting tool includes a replaceable pilot cooperating with the blade in such a manner as to be held thereby against rotation and cooperating with the means for removably securing the blade in the tool so as to be held by such means securely on the tool.

Other objects, advantages, and meritorious features will more fully appear from the specification, claims, and accompanying drawings, wherein:

Fig. 1 is a view partially in section showing one embodiment of our improved cutting tool;

Fig. 2 is a cross sectional view taken on the line 2—2 of Fig. 1;

Fig. 3 is a fragmentary view of our cutting tool showing a modification thereof;

Fig. 4 is a cross sectional view taken on the line 4—4 of Fig. 3;

Fig. 5 is a fragmentary view partially in section of a removable pilot for the cutting tool shown in Fig. 1; and Fig. 6 is another view of the embodiment shown in Fig. 5.

As shown in the Fig. 1 embodiment of the invention, the tool includes a shaft or stem 10 adapted to be mounted for rotation in a machine tool, a portion of which is indicated schematically at 12. Adjacent the outer end of the stem 10 it is provided with a transversely extending slot 14 which opens through opposite sides of the stem and includes parallel spaced-apart side walls 16 and 18 and opposed end walls 20 and 22. The slot 14 is spaced from the outer end 24 of the stem to provide a pilot portion on the stem at 26.

Removably received within the slot 14 is a cutter blade 28. The cutter blade is provided with two notches, one notch at each end of the blade. That end of the blade remote from the pilot 26 has the notch 30 cut therein to provide ear means adapted to overlie the sides of the stem 10 beyond the slot 14 and locate such end of the blade transversely within the slot. Such ear means comprise ears 32 and 34. The distance between ears 32 and 34 is sized to closely fit the diameter of the stem 10 at that end of the slot 14 over which the ears are received. The other notch in the blade is formed in that end thereof adjacent the pilot. Such notch extends longitudinally into the blade and terminates in a V-shaped end portion. Such notch is indicated at 36. Threadedly received through the pilot portion 26 of the stem is a fastener member 38. The fastener member is provided with a V-shaped nose 40 which is sized to snugly fit the V-shaped notch 36 in the blade.

The pilot portion 26 of the stem is provided with threads 42 with which the fastener or screw member 38 meshes. The thread diameter of the threads 42 is greater than the thickness of the slot 14. In forming the threads 42 the tap is run down through the provided hole in the pilot and into slot 14 to form partial threads in the opposed walls 16 and 18 of the slot so that the fastener member 38 will engage the partial threads in the side walls of the slot and thereby be held against shifting in the slot adjacent the blade. The notch 36 in the blade is sized in relation to the diameter of the threaded member 38 so that as the threaded member is threaded into the pilot and into engagement with the blade, there is a tight fit between the notch 36 and the screw threaded member 38.

The member 38 cooperatively with the ears 32 and 34 serves to locate the blade transversely within slot 14. The cone-shaped nose 40 of the member 38 seated tightly within the V-shaped end of the notch 36 of the blade urges the blade longitudinally of the stem 10 to seat the blade securely against the end wall 20 of the stem slot and at the same time accurately position the blade transversely within the slot.

The blade 28 is provided with parallel longitudinally extending edges 44 and 46 which may be beveled as shown in Fig. 2. The blade is provided with cutting edges extending substantially radially outwardly from stem 10 and intersecting the edges 44 and 46. Such cutting edges are indicated at 48 and 50 and may be beveled in the conventional manner. It will be noted that the cutting edges 48 and 50 are spaced from the end wall 22 of notch 14 by a distance just exceeding the height of ears 32 and 34 such that upon unscrewing the member 38, the blade may be shifted longitudinally to the right, as viewed in Fig. 1, and thereafter displaced transversely within slot 14 to be removed from the stem. The cutting edges 48 and 50 may thereupon be sharpened and the blade replaced in the stem and screw 38 retightened. By providing notch 36 at a greater depth within the blade, the blade may be repeatedly sharpened and replaced.

In operation the embodiment of Fig. 1 is rotated by the machine tool 12 and the pilot portion 26 introduced into the hole in the work piece which is to be counterbored. By feeding the stem into the hole the counterbore is formed at the diameter corresponding to that of the width of the blade 28.

Fig. 3 shows a modified form of the tool wherein the stem 10' is provided with a generally semi-circular slot 14' which opens through one side of the stem. The slot 14' is spaced from the end 24' of the stem to provide a pilot portion 26'. A blade 28' is provided which has a generally semi-circular portion 52 adapted to be received within the slot and mate with the semi-circular formation thereof. The blade is also provided with a longitudinally extending beveled edge 46' which parallels the axis of the stem spaced radially from the side of the stem. It will be noted that the edge portion 46' extends at one end beyond the slot 14' to provide ear means overlying the side of the stem beyond the slot. Such ear means comprises an ear 32'. Such ear prevents rotation of the blade when the thrust is applied against the cutting edge 48' of the tool during working of the tool.

That end of blade 28' adjacent pilot 26' is provided with a radially extending cutting edge aforementioned as 48'. Such cutting edge intersects the beveled edge 46' of the blade at substantially right angles. The cutting edge 48' is substantially perpendicular to the axis of rotation of the stem 10'. The cutting edge 48' lies on a radius of the stem as shown in Fig. 4. The side walls 16' and 18' of the slot 14' are parallel and the wall 16' lies in a radial plane of the stem 10' such that the cutting edge 46' will lie in the radial plane. The cutting edge 48' is beveled in the conventional fashion.

Blade 28' is held in the stem by a screw thread fastener 38' which is threaded transversely through the stem and through blade 28'. The blade is provided with an aperture 54 through which the fastener 38' is received. Such aperture is sized to tightly fit the thread diameter of the member 38'. The fastener 38' cooperatively with ear 32' serves to accurately position and lock blade 28' within the stem slot.

Shown in Figs. 5 and 6 is a removable pilot for a cutting tool of the type disclosed in Figs. 1 and 2. The pilot comprises a hollow cylindrical member 56 closed at one end as at 58 and telescoped over the pilot portion 26. The cylindrical wall of the pilot at the open end thereof is notched as at 60 and 62 to be received over the adjacent end of blade 28 as shown in Fig. 6. The notched engagement of the pilot with the blade prevents rotation of the pilot on the pilot portion 26. The pilot is held on the stem by a screw thread fastener 64 received through the end wall 58 and threaded into a threaded bore formed in the fastener member 38. The fastener member 38 may be provided with a hexagonal wrench-receiving socket 66 to provide for torquing the member 38 into place prior to insertion of the screw 64 therein.

What we claim is:

1. A piloted cutting tool comprising: a stem to be mounted on a machine tool for rotation relative to a work piece, said stem provided with a single slot extending longitudinally thereof and opening through opposite sides of the stem, said slot having opposed spaced apart side walls and opposed end walls, said slot spaced from one end of the stem to provide a pilot portion on the stem disposed between the slot and the end of the stem, said pilot portion having a cylindrical surface and provided with a screw-threaded aperture extending axially completely through the pilot and opening into the slot at one end and outwardly of the pilot at the opposite end, said aperture having a thread diameter greater than the distance between opposed side walls of said slot, the threads of said aperture extending into the slot and formed in the opposed side walls thereof, a blade removably received in said slot and having an overall length less than the length of the slot and a width greater than the diameter of the pilot, that end of the blade adjacent the pilot provided with cutting edge portions at opposite sides of the stem with each such portion extending substantially radially away from the stem from a point co-cylindrical with said cylindrical surface of the pilot portion, the opposite end of the blade provided with an end face to abut that end of the stem slot remote from the pilot, the cutting end of the blade provided with a notch extending longitudinally of the blade and perpendicular to said end face and having substantially parallel side edges and terminating in a V-shape at the inner end of the notch, a threaded member threadedly received in the pilot aperture and having a thread diameter tightly fitting between said parallel side edge of the notch in the blade and meshing in the threads of said aperture and in the threads of the opposed walls of the stem slot, said threaded member having a cone-shaped nose tightly urged into the V-shaped inner end of the notch in the blade positioning the cutting end of the blade transversely of the stem and urging said end face of the blade against the opposite end of the stem slot.

2. The invention defined in claim 1 characterized in that a hollow cylindrical pilot closed at one end is removably received over said pilot portion, the cylindrical wall of said pilot at the open end thereof being notched at diametrically opposed points with the notches received over the cutting end of the blade, and means cooperating with said hollow pilot and the stem to removably secure the hollow pilot on said pilot portion.

References Cited in the file of this patent

UNITED STATES PATENTS

| | | |
|---|---|---|
| 241,481 | Faught | May 17, 1881 |
| 289,522 | Faught | Dec. 4, 1883 |
| 421,176 | Lea | Feb. 11, 1890 |